United States Patent
Hampton et al.

(10) Patent No.: US 9,268,580 B2
(45) Date of Patent: Feb. 23, 2016

(54) OVERLAYING HELP, TRAINING, DOCUMENTATION, OR TRANSLATION OVER AN EXISTING APPLICATION

(75) Inventors: Mark Carl Hampton, Newtown (AU); Eric Martinez de Morentin, Manly (AU)

(73) Assignee: International Business Machines Corporation, Armonk, NY (US)

( * ) Notice: Subject to any disclaimer, the term of this patent is extended or adjusted under 35 U.S.C. 154(b) by 1928 days.

(21) Appl. No.: 11/954,889

(22) Filed: Dec. 12, 2007

(65) Prior Publication Data

US 2009/0158205 A1    Jun. 18, 2009

(51) Int. Cl.
*G06F 3/14* (2006.01)
*G06F 9/44* (2006.01)

(52) U.S. Cl.
CPC ............ *G06F 9/4446* (2013.01); *G06F 9/4448* (2013.01)

(58) Field of Classification Search
USPC .......... 715/200–277, 700–867; 700/701–866; 709/201–229; 705/50–79; 345/30–111, 345/629; 725/110; 718/104; 382/232
See application file for complete search history.

(56) References Cited

U.S. PATENT DOCUMENTS

| | | | |
|---|---|---|---|
| 5,481,667 A * | 1/1996 | Bieniek et al. | 715/709 |
| 7,085,420 B2 * | 8/2006 | Mehrotra | 382/232 |
| 7,284,202 B1 * | 10/2007 | Zenith | 715/744 |
| 7,716,669 B2 * | 5/2010 | Simon et al. | 718/104 |
| 2006/0274086 A1 * | 12/2006 | Forstall et al. | 345/629 |
| 2008/0163090 A1 * | 7/2008 | Cortright | 715/771 |
| 2008/0282302 A1 * | 11/2008 | Steelberg et al. | 725/110 |

* cited by examiner

*Primary Examiner* — Ruay Ho
(74) *Attorney, Agent, or Firm* — Yee & Associates, P.C.; Steven L. Bennett

(57) ABSTRACT

A computer implemented method, a computer program product, and a data processing system provide overlays to an application. An application state of the application is identified. Responsive to identifying the application state, an appropriate overlay corresponding to the application state is identified. Responsive to identifying the appropriate overlay, the appropriate overlay is overlain onto the application. The appropriate overlay is then displayed in real time in a user interface, with the appropriate overlay overlain in the user interface of the application.

12 Claims, 3 Drawing Sheets

OVERLAYING HELP, TRAINING, DOCUMENTATION, OR TRANSLATION OVER AN EXISTING APPLICATION

BACKGROUND OF THE INVENTION

1. Field of the Invention

The present invention relates generally to an improved data processing system. More specifically, the present invention relates to a computer implemented method, a computer program product, and a data processing system to overlay help, training, documentation, or translation over an existing application.

2. Description of the Related Art

As computer software and hardware become increasingly complex, the interface between the data processing system and a user becomes more important. Users who have difficulty remembering, understanding, and properly entering complicated computer instructions to operate relatively simple data processing system software and hardware will surely have difficulty interfacing with such data processing systems as their capabilities and complexity increase.

In order to increase a data processing system user's efficiency, data processing system hardware and software manufacturers have recently provided so-called graphical user interfaces (GUIs). Presently, many graphical user interfaces are known to those persons skilled in the art, and each such interface provides data processing system users a more visual and intuitive means for entering data, entering commands, and viewing computational results.

Software is sold in many countries and regions where various languages, both official and unofficial, are spoken. Translating the graphical user interface of an application is costly. Added translation and development expenses are difficult to justify when a vendor does not yet know what languages their customers will desire for the application.

SUMMARY OF THE INVENTION

A computer implemented method, a computer program product, and a data processing system provide overlays to an application's graphical user interface. An application state of the application is identified. Responsive to identifying the application state, an appropriate overlay corresponding to the application state is identified. Responsive to identifying the appropriate overlay, the appropriate overlay is overlain onto the application. The appropriate overlay is then displayed in real time in a user interface, with the appropriate overlay being overlain in the graphical user interface of the application.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
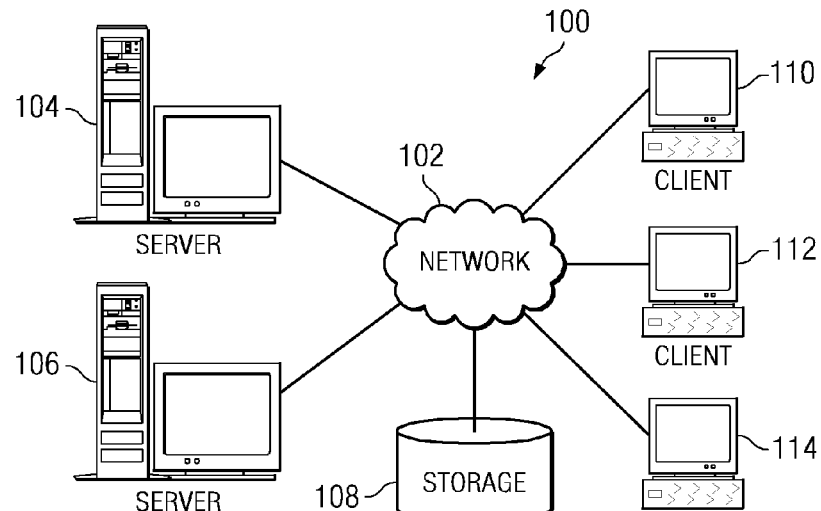
FIG. 1 is a pictorial representation of a network of data processing systems in which illustrative embodiments may be implemented.
Figure 2:
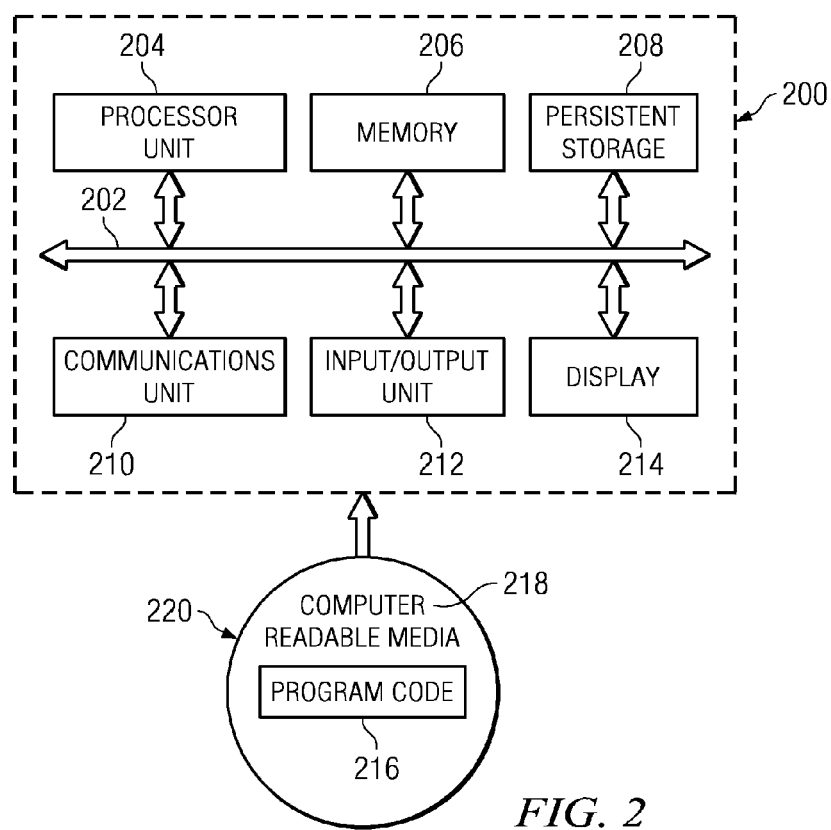
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

According to an illustrative embodiment, server 104 can provide overlays from an overlay broker to applications executing on clients 110, 112, and 114. The provided overlays "physically" overlay labels, descriptions, and tool tips on top of an existing application interface of the application executing on clients 110, 112, and 114. This overlay allows parts of the screen to be permanently re-labeled by covering existing text and images with replacement text and images.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments use application state inspection technology to physically overlay labels, descriptions, and tool tips on top of an existing application interface. This type of overlay allows parts of the screen to be permanently re-labeled by covering existing text and images with replacement text and images. The screen can similarly be temporarily labeled or otherwise marked up only when a user presses a key or button, or hovers over the interface; otherwise re-labeling of the application interface occurs at real time without the need to restart the underlying application.

Using event triggers or timers or history of state/actions the overlay system could even modify the behavior of the application by suggesting the user perform actions, or tips to improve their efficiency. A macro style replay allows a string of actions to be tied together.

A macro, a script, a batch file, or other list of commands can be utilized to tie the application state to the overlay actions. The list of commands is a transparent overlay on top of an application, capturing all user input and passing the actions through unchanged. The list of commands can also notify the overlay system to generate a label, or kicking off a timer for delayed labeling. A macro, a script, a batch file, or other list of commands is a program or sequence of instructions that is typically interpreted or carried out by a program separate from underlying application.

Figure 3:
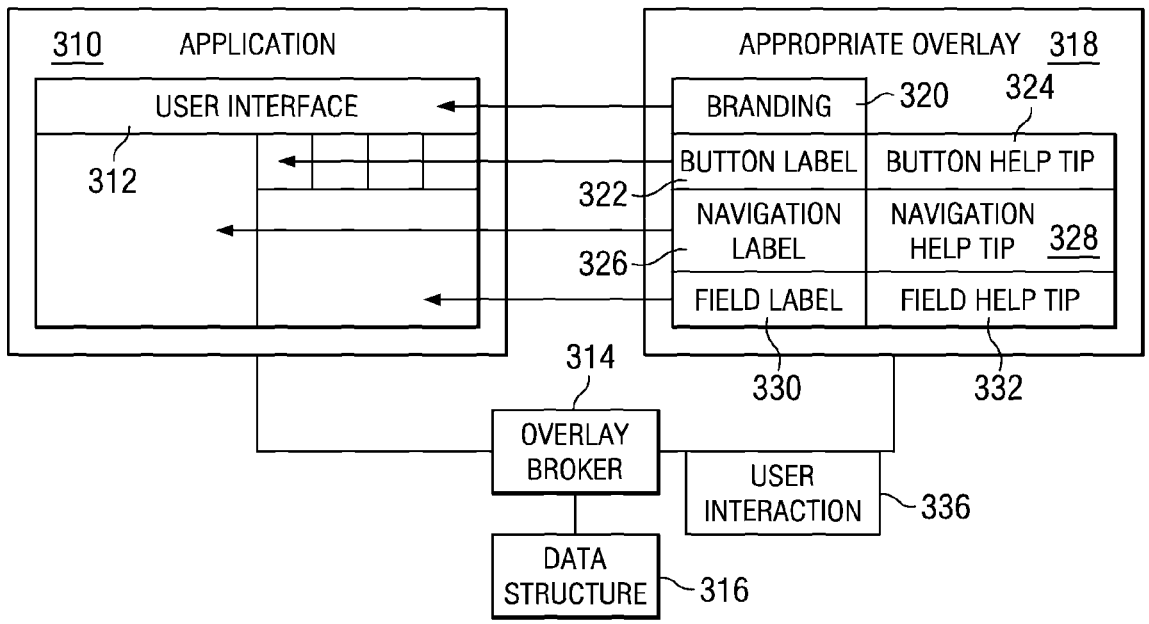
FIG. 3 is a diagram illustrating data flow between various software components according to an illustrative embodiment.

Referring now to FIG. 3, a diagram illustrating data flow between various software components is described according to an illustrative embodiment. Application 310 is a software application executing on a data processing system, such as data processing system 200 of FIG. 2. A user utilizes application 310 through user interface 312.

Overlay broker 314 is a software component executing on a data processing system. Overlay broker 314 detects application states and select an appropriate overlay based on the detected application state. Overlay broker 314 may be, for example, a macro, a script, or a batch file. Overlay broker can execute locally at a client, such as clients 110, 112, and 114 of FIG. 1. Alternatively, overlay broker 314 can execute remotely on a server, such as server 104 of FIG. 1. The overlay broker could access the client through a network, such as network 102 of FIG. 1.

Overlay broker 314 detects an application state of application 310. Overlay broker 314 detects the application state of application 310. The application state of application 310 can be detected by any means known in the art. For example, overlay broker 314 may detect an event trigger, the expiration of a timer, or determine a sequence of historical actions in application 310.

Based on the detection of the application state by overlay broker 314, overlay broker 314 identifies appropriate overlay 318. Appropriate overlay 318 can be identified from a set of overlays contained within data structure 316. The set of overlays comprises one or more overlays. Data structure 316 can be stored either locally with overlay broker 314, or remotely at another location, such as another server, data processing system, or data storage media.

Overlay broker 314 launches appropriate overlay 318. Appropriate overlay 318 can contain a set of data fields, a set of graphics, and a set of user interface components, and a set of inputs. Appropriate overlay 318 contains data fields and inputs, such as branding 320, button label 322, button help tip 324, navigation label 326, navigation help tip 328, field label 330, and field help tip 332. Each of the data fields presented from appropriate overlay 318 is mapped to corresponding fields within user interface 312 of application 310.

An overlay, such as appropriate overlay 318, is one of two or more pieces of code or data that can be loaded to a pre-determined memory region on demand at runtime. Initially, each overlay is stored in persistent memory, just like ordinary code or data. During runtime, an overlay can be copied to a known address in random access memory and executed there when required. This can later be replaced by another overlay when required. Typically, only one overlay occupies a given RAM address at any given time. Appropriate overlay 318 is an overlay matching the detected application state within data structure 316.

Once appropriate overlay 318 is launched, appropriate overlay 318 is overlain on top of or displayed over user interface 312. A user viewing and using user interface 312 will see the data fields and inputs of appropriate overlay 318, such as branding 320, button label 322, button help tip 324, navigation label 326, navigation help tip 328, field label 330, and field help tip 332, and not the original corresponding fields of user interface 312. The appropriate overlay 318 is provided to user interface 312 at real time, without the need to restart the underlying application.

Because each of the data fields and inputs of appropriate overlay 318 are mapped to corresponding data fields and inputs of user interface 312, a user can input data directly into the data fields and inputs of appropriate overlay 318. The data input from the user is then passed or mirrored to the corresponding data fields and inputs of user interface 312. When the user initiates an action, or inputs data using appropriate overlay 318, the action is performed and the data is received by user interface 312 for use by application 310. In other words, appropriate overlay 318 acts as another interface that may obscure parts of user interface 312.

Overlay broker 314 captures user interaction 336 taken within appropriate overlay 318. User interaction 336 is any input of data into appropriate overlay 318, the initiation of an action using appropriate overlay 318, or a change in the application state of appropriate overlay 318. Overlay broker 314 then passes user interaction 336 to the user interface 312 of application 310. While the user interaction may be performed to generate user input on appropriate overlay 318, application 310 receives the user input as if it were input directly into user interface 312. A macro, a script, a batch file, or other list of commands can be utilized to transfer user interaction 336 from appropriate overlay 318 to user interface 312. That is, user interaction 336 is transferred from appropriate overlay 318 to user interface 312 using a program or sequence of instructions that is typically interpreted or carried out by a program separate from application 310.

Figure 4:
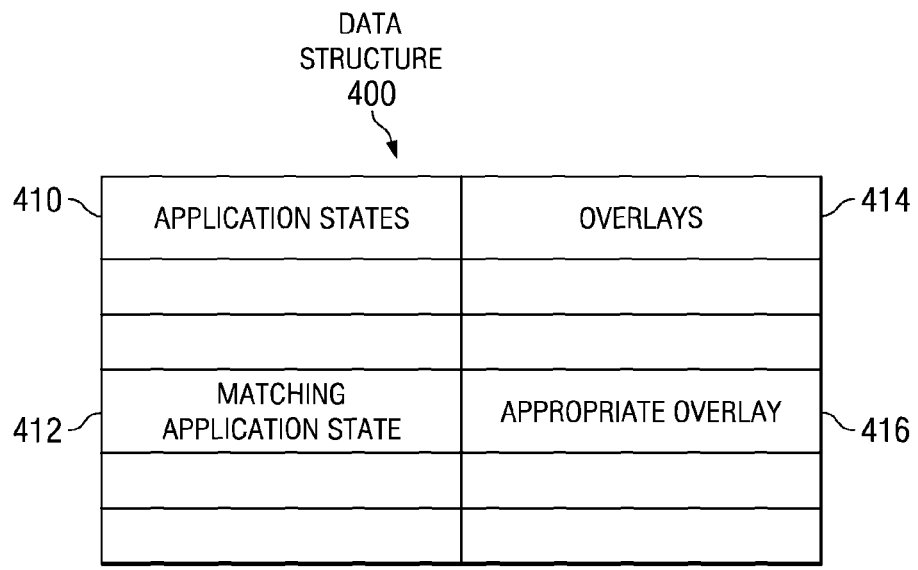
FIG. 4 is a data structure for determining an appropriate overlay based on the application state of an application according to an illustrative embodiment.

Referring now to FIG. 4, a data structure for determining an appropriate overlay based on the application state of an application is shown according to an illustrative embodiment. Data structure 400 is an example of data structure 316 of FIG. 3.

Application states 410 are information relating to the current state of an application, such as application 310. Application states 410 can include, for example, without limitation, event triggers, the expiration of a timer, or can determine a sequence of historical actions in an application or other state information of the application.

Upon retrieving an application state from an application, an overlay broker, such as overlay broker 314 of FIG. 3, determines whether the retrieved application state matches any of application states 410 contained in data structure 400.

Upon identifying that the retrieved application state matches matching application state 412 from application states 410, the overlay broker can identify the appropriate overlay 416 from overlays 414 of data structure 400. Appropriate overlay 416 can contain a set of data fields, a set of graphics, and a set of user interface components, and a set of inputs. Each field of appropriate overlay 416 is mapped to a corresponding field within a user interface of the application. A macro, a script, a batch file, or other list of commands can be utilized to map the data fields and inputs of the appropriate overlay to corresponding fields within a user interface of the application. That is, the user interaction is transferred from the appropriate overlay to the user interface using a program or sequence of instructions that is typically interpreted or carried out by a program separate from application 310. Appropriate overlay 416 is overlain on top of user interface. Any user interaction performed on appropriate overlay 416 is received by the application as if the interaction were input directly into user interface.

While data structure 400 is presented in the form of a look-up table, such an embodiment is not limiting. Data structure 400 can be, for example, without limitation, arrays, stacks, queues, linked lists, trees, and graphs.

Figure 5:
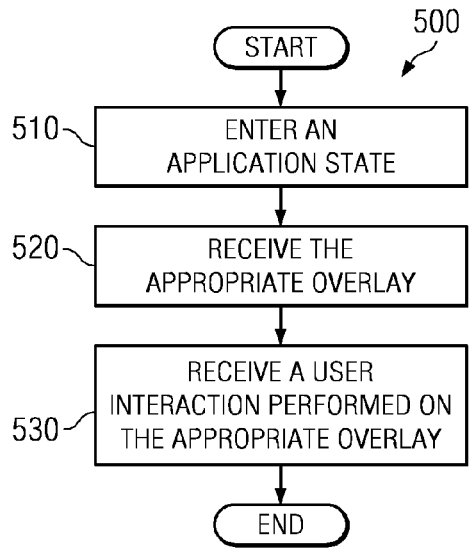
FIG. 5 is a flowchart depicting processing steps for receiving user interaction within an overlay according to an illustrative embodiment.

Referring now to FIG. 5, a flowchart depicting processing steps for receiving user interaction within an overlay is shown according to an illustrative embodiment. Process 500 is a software process, executing on a software component, such as application 310 of FIG. 3.

Process 500 begins by entering an application state (step 510). In these illustrative examples, the application state is an event trigger, the expiration of a timer, the determination of a sequence of historical actions, or some other means of detecting the current state of the application within process 500 that is detected by an overlay broker.

Responsive to entering the application state, the application state is retrieved by the overlay broker. The overlay broker then identifies an appropriate overlay, based on the detected application state.

Process 500 continues by receiving the appropriate overlay from the overlay broker (step 520). The appropriate overlay is overlain on top of a user interface of process 500. The appropriate overlay is provided to the user interface at real time, without the need to restart the underlying application. Because each of the data fields and inputs of the appropriate overlay are mapped to corresponding data fields and inputs of the user interface of process 500, a user can input data directly into the data fields and inputs of the appropriate overlay. The data input from the user is then passed or mirrored to the corresponding data fields and inputs of the user interface of process 500.

Process 500 then receives a user interaction performed on the appropriate overlay (step 530), with the process terminating thereafter. A macro, a script, a batch file, or other list of commands can be utilized to map the data fields and inputs of the appropriate overlay to corresponding fields within a user interface of the application. That is, the user interaction is transferred from the appropriate overlay to the user interface using a program or sequence of instructions that is typically interpreted or carried out by a program separate from the underlying application. Process 500 receives the user interaction as if the interaction were input directly into user interface.

Figure 6:
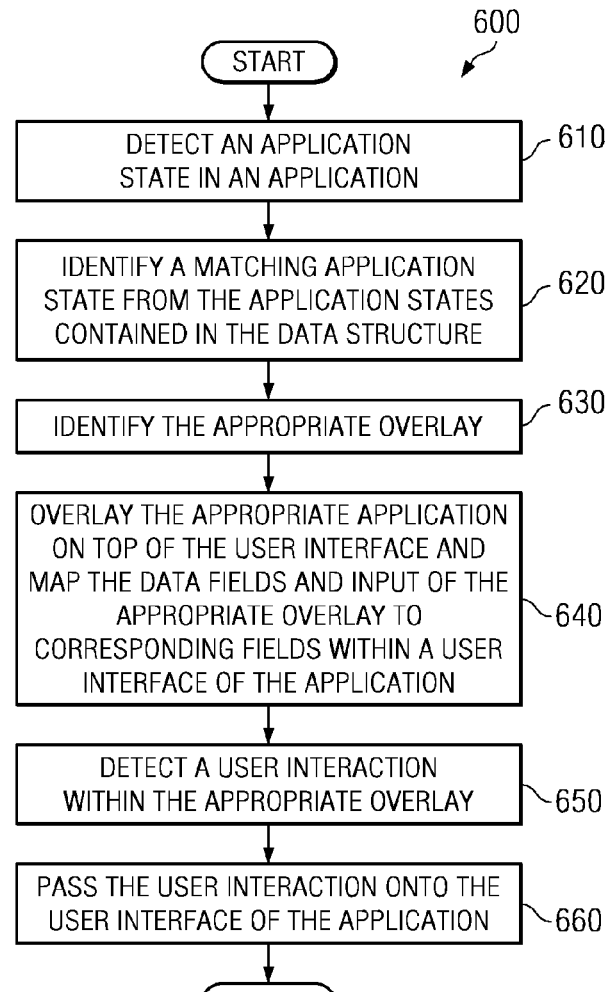
FIG. 6 is a flowchart depicting processing steps for identifying an application state and determining an appropriate overlay according to an illustrative embodiment.

Referring now to FIG. 6, a flowchart depicting processing steps for identifying an application state and determining an appropriate overlay is shown according to an illustrative embodiment. Process 600 is a software process, executing on a software component, such as overlay broker 314 of FIG. 3.

Process 600 begins by detecting an application state in an application (step 610), such as application 310 of FIG. 3. The application state can be detected by the occurrence of an event trigger, an expiration of a timer, or the determination of any other action or sequence of historical actions within the application that is detected by process 600.

Responsive to detecting the application state, process 600 identifies a matching application state from the application states contained in a data structure (step 620). The data structure contains possible application states, as well as corresponding appropriate overlays for those possible application states. The data structure can be data structure 316 of FIG. 3.

Responsive to identifying the matching application state, process 600 identifies the appropriate overlay (step 630). The appropriate overlay contains data fields and inputs that are mapped to corresponding fields within a user interface of the application.

Process 600 overlays the appropriate application on top of user interface and maps the data fields and inputs of the appropriate overlay to corresponding fields within a user interface of the application (step 640). A macro, a script, a batch file, or other list of commands can be utilized to map the data fields and inputs of the appropriate overlay to corresponding fields within a user interface of the application. That is, the user interaction is transferred from the appropriate overlay to the user interface using a program or sequence of instructions that is typically interpreted or carried out by a program separate from the underlying application. The overlay is provided to the application interface in real time, without the need to restart the underlying application. Any user interaction performed on the appropriate overlay is received by the application as if the interaction were input directly into user interface.

Process 600 detects a user interaction within the appropriate overlay (step 650). The user interaction is any input of data into the appropriate overlay, the initiation of an action using the appropriate overlay, or a change in the application state of the appropriate overlay.

Process 600 then passes the user interaction onto the user interface of the application (step 660), with the process terminating thereafter. While the user interaction may be performed on the appropriate overlay, the application receives a user interaction as if it were input directly into user interface.

The illustrative embodiments use application state inspection technology to "physically" overlay labels, descriptions, and tool tips on top of an existing application interface. This overlay allows parts of the screen to be permanently re-labeled by covering existing text and images with replacement text and images. The screen can similarly be temporarily labeled or otherwise marked up only when a user presses a key or button, or hovers over the interface. Re-labeling of the application interface occurs at real time, without the need to restart the underlying application.

Using event triggers, timers, or history of state/actions, the overlay system could even modify the behavior of the application by suggesting the user perform actions or tips to improve their efficiency. A macro style replay allows a string of actions to be tied together.

A runtime ties the application state to the overlay actions. The runtime is a transparent overlay on top of an application, capturing all user input and passing the actions through unchanged. The runtime can also notify the overlay system to generate a label, or kick off a timer for delayed labeling.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing overlays to an application, the method comprising:
   identifying an application state of the application during execution of the application;
   responsive to identifying the application state, identifying an appropriate overlay from a data structure containing a set of overlays, the appropriate overlay corresponding to the application state, wherein the appropriate overlay provides at least one of replacement labels, replacement descriptions, and replacement tool tips to be overlain on top of an existing text and images within a user interface of the application;
   responsive to identifying the appropriate overlay, overlaying the appropriate overlay onto the application, wherein the application state is a retrieved application state, and wherein the data structure further contains a set of application states, each of the set of overlays corresponding to at least one of the set of application states, the appropriate overlay being identified if the retrieved application state matches any of the set of application states;
   mapping at least one of a set of data fields of the appropriate overlay, a set of graphics of the appropriate overlay, and a set of user interface components of the appropriate overlay to at least one of a set of corresponding data fields of the user interface of the application, a set of corresponding graphics of the user interface of the application, and a set of corresponding user interface components of the user interface of the application;
   displaying the appropriate overlay during the execution of the application, wherein the appropriate overlay is overlain on the user interface of the application, wherein a user viewing the user interface of the application sees the set of data fields of the appropriate overlay and not the least one of the set of corresponding data fields of the user interface of the application, the set of corresponding graphics of the user interface of the application, and the set of corresponding user interface components of the user interface of the application;
   receiving a user interaction within at least one of the set of data fields of the appropriate overlay, the set of graphics of the appropriate overlay, and the set of user interface components of the appropriate overlay; and
   passing the user interaction from the at least one of the set of data fields of the appropriate overlay, the set of graphics of the appropriate overlay, and the set of user interface components of the appropriate overlay to at least one of the set of corresponding data fields of the user interface of the application, the set of corresponding graphics of the user interface of the application, and the set of corresponding user interface components of the user interface of the application.

2. The computer implemented method of claim 1, further comprising:
   identifying the application state of the application, wherein the application state is identified from at least one of an event trigger, an expiration of a timer, or determination of a sequence of historical actions.

3. The computer implemented method of claim 1, wherein the set of data fields, the set of graphics, and the set of user interface components includes at least one of a branding, a button label, a button help tip, a navigation label, a navigation help tip, a field label, and a field help tip.

4. The computer implemented method of claim 1, wherein the user interaction is selected from the group comprising an input of data into the appropriate overlay, an initiation of an action using the appropriate overlay, and a change in the application state of the appropriate overlay.

5. A computer program product comprising:
   a computer readable medium having computer usable program code for providing overlays to an application, the computer program product comprising:
   computer usable program code for identifying an application state of the application during execution of the application;
   computer usable program code, responsive to identifying the application state, for identifying an appropriate overlay, the appropriate overlay corresponding to the application state, wherein the appropriate overlay provides at least one of replacement labels, replacement descriptions, and replacement tool tips to be overlain on top of an existing text and images within a user interface of the application;
   computer usable program code, responsive to identifying the appropriate overlay, for overlaying the appropriate overlay onto the application, wherein the application state is a retrieved application state, and wherein the data structure further contains a set of application states, each of the set of overlays corresponding to at least one of the set of application states, the appropriate overlay being identified if the retrieved application state matches any of the set of application states;
   computer usable program code for mapping at least one of a set of data fields of the appropriate overlay, a set of graphics of the appropriate overlay, and a set of user interface components of the appropriate overlay to at least one of a set of corresponding data fields of the user interface of the application, a set of corresponding graphics of the user interface of the application, and a set of corresponding user interface components of the user interface of the application;
   computer usable program code for displaying the appropriate overlay during the execution of the application, wherein the appropriate overlay is overlain on the user interface of the application, wherein a user viewing the user interface of the application sees the set of data fields of the appropriate overlay and not the at least one of the set of corresponding data fields of the user interface of the application, the set of corresponding graphics of the user interface of the application, and the set of corresponding user interface components of the user interface of the application;
   computer usable program code for receiving a user interaction within at least one of the set of data fields of the appropriate overlay, the set of graphics of the appropriate overlay, and the set of user interface components of the appropriate overlay; and computer usable program code for passing the user interaction from the at least one of the set of data fields of the appropriate overlay, the set of graphics of the appropriate overlay, and the set of user interface components of the appropriate overlay to at least one of the set of corresponding data fields of the user interface of the application, the set of corresponding graphics of the user interface of the application, and the set of corresponding user interface components of the user interface of the application.

6. The computer program product of claim 5 further comprising:

computer usable program code, for identifying the application state of the application, wherein the application state is identified from at least one of an event trigger, an expiration of a timer, or a determination of a sequence of historical actions.

7. The computer program product of claim 5, wherein the computer usable program code for mapping the set of data fields, the set of graphics, and the set of user interface components to the set of corresponding data fields, the set of corresponding graphics, and the set of corresponding user interface components includes at least one of mapping a branding, mapping a button label, mapping a button help tip, mapping a navigation label, mapping a navigation help tip, mapping a field label, and mapping a field help tip.

8. The computer program product of claim 5, wherein the computer usable program code for receiving the user interaction is selected from the group comprising computer usable program code for receiving an input of data into the appropriate overlay, computer usable program code for receiving an initiation of an action using the appropriate overlay, and computer usable program code for receiving a change in the application state of the appropriate overlay.

9. A data processing system comprising:
a bus;
a communications unit connected to the bus;
a storage device connected to the bus, wherein the storage device includes computer usable program code; and
a processor unit connected to the bus, wherein the processor unit executes the computer usable program code to identify an application state of the application during execution of the application, responsive to identifying the application state, to identify an appropriate overlay from a data structure containing a set of overlays, the appropriate overlay corresponding to the application state, wherein the appropriate overlay provides at least one of replacement labels, replacement descriptions, and replacement tool tips to be overlain on top of an existing text and images within a user interface of the application, responsive to identifying the appropriate overlay, to overlay the appropriate overlay onto the application, wherein the application state is a retrieved application state, and wherein the data structure further contains a set of application states, each of the set of overlays corresponding to at least one of the set of application states, the appropriate overlay being identified if the retrieved application state matches any of the set of application states, to map at least one of a set of data fields of the appropriate overlay, a set of graphics of the appropriate overlay, and a set of user interface components of the appropriate overlay to the at least one of a set of corresponding data fields of the user interface of the application, a set of corresponding graphics of the user interface of the application, and a set of corresponding user interface components of the user interface of the application, to display the appropriate overlay during the execution of the application, wherein the appropriate overlay is overlain on the user interface of the application, wherein a user viewing the user interface of the application sees the set of data fields of the appropriate overlay and not the at least one of the set of corresponding data fields of the user interface of the application, the set of corresponding graphics of the user interface of the application, and the set of corresponding user interface components of the user interface of the application, to receive a user interaction within at least one of the set of data fields of the appropriate overlay, the set of graphics of the appropriate overlay, and the set of user interface components of the appropriate overlay, and to pass the user interaction from the at least one of the set of data fields of the appropriate overlay, the set of graphics of the appropriate overlay, and the set of user interface components of the appropriate overlay to at least one of the set of corresponding data fields of the user interface of the application, the set of corresponding graphics of the user interface of the application, and the set of corresponding user interface components of the user interface of the application.

10. The data processing system of claim 9, wherein the processor unit executes the computer usable program code:
to identify the application state of the application, wherein the application state is identified from at least one of an event trigger, an expiration of a timer, or determination of a sequence of historical actions.

11. The data processing system of claim 9, wherein the set of data fields, the set of graphics, and the set of user interface components includes at least one of a branding, a button label, a button help tip, a navigation label, a navigation help tip, a field label, and a field help tip.

12. The data processing system of claim 9, wherein the user interaction is selected from the group comprising an input of data into the appropriate overlay, an initiation of an action using the appropriate overlay, and a change in the application state of the appropriate overlay.

\* \* \* \* \*